(12) United States Patent
Altmann et al.

(10) Patent No.: US 7,571,664 B2
(45) Date of Patent: Aug. 11, 2009

(54) DEVICE FOR FASTENING A COMPONENT TO A STEERING COLUMN JACKET

(75) Inventors: Markus Altmann, Moos (DE); Markus Mauch, Aichwald (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 571 days.

(21) Appl. No.: 11/030,404

(22) Filed: Jan. 6, 2005

(65) Prior Publication Data

US 2005/0184536 A1    Aug. 25, 2005

(30) Foreign Application Priority Data

Jan. 7, 2004    (DE)    .................. 20 2004 000 110 U

(51) Int. Cl.
  *B62D 1/16*    (2006.01)
(52) U.S. Cl. ................. 74/492; 74/493; 248/222.52
(58) Field of Classification Search ............ 248/222.52, 248/634; 200/61.54, 61.27; 74/492, 493; 285/314, 376, 377, 401; 403/109.5 X, 300, 403/309, 314, 350 X, 409.1; 280/771
See application file for complete search history.

(56) References Cited

U.S. PATENT DOCUMENTS

| | | | | |
|---|---|---|---|---|
| 4,404,438 A | | 9/1983 | Honjo | |
| 4,598,562 A | * | 7/1986 | Freeman | ....................... 70/237 |
| 4,857,706 A | * | 8/1989 | Diamond | ..................... 392/383 |
| 5,356,183 A | * | 10/1994 | Cole | .......................... 285/305 |
| 5,704,633 A | | 1/1998 | Durrani et al. | |
| 6,179,512 B1 | * | 1/2001 | Gibson et al. | ............ 403/374.1 |
| 2005/0017482 A1 | | 1/2005 | Kruezer et al. | |

FOREIGN PATENT DOCUMENTS

| | | |
|---|---|---|
| EP | 0688032 | 12/1995 |
| EP | 1500561 | 1/2005 |

* cited by examiner

*Primary Examiner*—Gwendolyn Baxter
(74) *Attorney, Agent, or Firm*—Tarolli, Sundheim, Covell & Tummino LLP

(57) ABSTRACT

A device (10) for fastening a component to a steering column jacket (20, 20'), comprises a fastening sleeve (12) and an equalizer (14) associated with the fastening sleeve (12). The fastening sleeve (12) has at least one mounting section (18) and convexities (22) adjoining the mounting section (18). The mounting section (18) has a first mounting cross-section to receive the steering column jacket (20; 20'), and the equalizer (14) comprises equalizing jaws (16) laterally movable in the fastening sleeve (12), which are movable between a first position in which they are received in the convexities (22), and a second position in which they lie at least partially in the mounting section (18) and define a second mounting cross-section for the steering column jacket (20; 20'), which is smaller than the first mounting cross-section.

16 Claims, 4 Drawing Sheets

10. # DEVICE FOR FASTENING A COMPONENT TO A STEERING COLUMN JACKET

TECHNICAL FIELD

The invention relates to a device for fastening a component to a steering column jacket. In particular, the invention is directed to a fastening device for a steering column switch module or a steering column jacket switch module.

BACKGROUND OF THE INVENTION

The steering device of a motor vehicle usually comprises a steering spindle mounted in a steering column jacket, which steering spindle is connected with the steering wheel. Various components are fastened to the steering column jacket which serve for the control and actuation of vehicle functions. The steering column switch modules or steering column jacket switch modules generally each comprise a signal flasher switch, and a wiper switch for the gradual actuation of the windscreen wipers and for the switching functions of the windscreen washer arrangement. Furthermore, in the steering column jacket switch modules, various interfaces and evaluation units can be arranged, for example associated with power assisted steering systems, driving angle sensors and steering angle sensors.

The usual fastening devices for the steering column switch modules or steering column jacket switch modules are designed specifically to the vehicle and can therefore only be used for one steering column jacket diameter. This necessitates an extensive stock to be maintained at vehicle manufacturers and workshops, and also high storage costs.

SUMMARY OF THE INVENTION

It is therefore the object of the invention to avoid these disadvantages and to provide a fastening device of the type initially mentioned which is able to be used for various vehicle types.

According to the invention, a device is provided for fastening a component to a steering column jacket, comprising a fastening sleeve and an equalizer associated with the fastening sleeve, the fastening sleeve having at least one mounting section and convexities adjoining the mounting section, and the mounting section defining a first mounting cross-section to receive the steering column jacket, and the equalizer comprising equalizing jaws laterally movable in the fastening sleeve, which are movable between a first position in which they are received in the convexities, and a second position in which they lie at least partially in the mounting section and define a second mounting cross-section for the steering column jacket, which is smaller than the first mounting cross-section.

The invention, therefore, provides a fastening device for example for a steering column jacket switch module, which can be used for at least two different steering column jackets having different external diameters. This is made possible by the equalizing jaws which are movable in the mounting sleeve, which reduce the original large mounting cross-section or left-hand diameter of the fastening sleeve to a smaller mounting cross-section, when they lie in the mounting section of the fastening sleeve. On movement of the equalizing jaws, these disappear in the convexities provided for this on the fastening sleeve, so that the mounting cross-section is enlarged to the original measurement and the fastening sleeve fits a steering column jacket with a larger external diameter. The fastening sleeve according to the invention is therefore advantageously suitable for fastening to various steering column jackets. As the difference of the mounting cross-sections or the steering column jacket diameters is determined by the thickness of the equalizing jaws, the fitting steering column jackets can be selected in a simple manner. The equalizers of the fastening device according to the invention are, in addition, able to be produced in a simple manner by plastic injection molding. Therefore, the storage of various fastening devices with different clamping diameters can also be dispensed with. Rather, the storage can be reduced to the different equalizers. Hereby, likewise, considerable cost savings are able to be realized.

The equalizing jaws of the fastening device according to the invention are preferably connected with each other by cross-pieces or bridges. The cross-pieces can be formed from spring steel, for example. However, it is particularly preferable if the cross-pieces and the equalizing jaws are formed in one piece with each other from plastic. The cross-pieces stabilize the equalizer and increase the mechanical strength. With the use of plastic as material for the cross-pieces, a particularly simple and favourably priced manufacture is possible.

It is expedient if the equalizer has integrally molded tongues which facilitate a displacement or turning of the equalizing jaws. The tongues, which are molded integrally with the equalizer preferably in the region of the equalizing jaws, can serve in addition as engagement points for a tool and can therefore facilitate the installation and/or actuation of the equalizer.

Particularly preferably, the mounting section of the fastening sleeve for the steering column jacket is constructed so as to have a circular segment shape in cross-section. The shape of the mounting section of the fastening sleeve then corresponds to the shape of the steering column jacket, so that the mounting section, of circular segment shape in cross-section, lies securely against the outer periphery of the steering column jacket and clamps it in the first mounting cross-section, when the equalizing jaws are in the first position in which they are held in the radially projecting convexities on the fastening sleeve.

Also, the equalizing jaws are preferably arranged so as to be movable rotatably about a central axis of the fastening sleeve, the shape of the equalizing jaws preferably corresponding with the shape of the convexity. Hereby, a simple actuation of the equalizer is made possible with, at the same time, a high mechanical stability. The adaptation of the shape of the convexities to the shape of the equalizing jaws reduces the space requirement for the fastening device according to the invention.

According to a particularly preferred embodiment, the convexities have oblique side walls and the equalizing jaws have chamfered side surfaces and also a concave clamping surface facing the steering column jacket. They can thereby be turned easily out from the convexities and transferred into the second position. In this position, a steering column jacket with a smaller external diameter can be inserted and is held securely between the concave clamping surfaces of the equalizing jaws.

The equalizer with the equalizing jaws arranged thereon is preferably a component that is separate from the fastening sleeve. So that it is securely held in the sleeve, it is preferably under a pre-stressing such that the equalizing jaws are acted upon by a spring force also in the first position and are thus held in the convexities. The spring force can be produced for example in that the equalizer with the cross-pieces and the equalizing jaws is formed in the shape of a split ring, the internal diameter of which is slightly greater than that of the first mounting cross-section. During insertion of the equalizing jaws into the convexities of the fastening sleeve, the split ring is then slightly compressed and thus receives the desired pre-stressing.

It is, in addition, advantageous if the equalizer can assume only two defined positions on the fastening sleeve. These positions can be realized for example by limit stops and/or a corresponding shape of the equalizer. For example, on the fastening sleeve a shoulder can be provided, against which a projection abuts which is formed on the equalizer. In addition, it is possible to provide a detent connection between the fastening sleeve and the equalizer, which fixes the equalizer in the first or second position.

Further features and advantages of the present invention will be apparent from the following description of a preferred embodiment in connection with the drawings in which.

Figure 1:
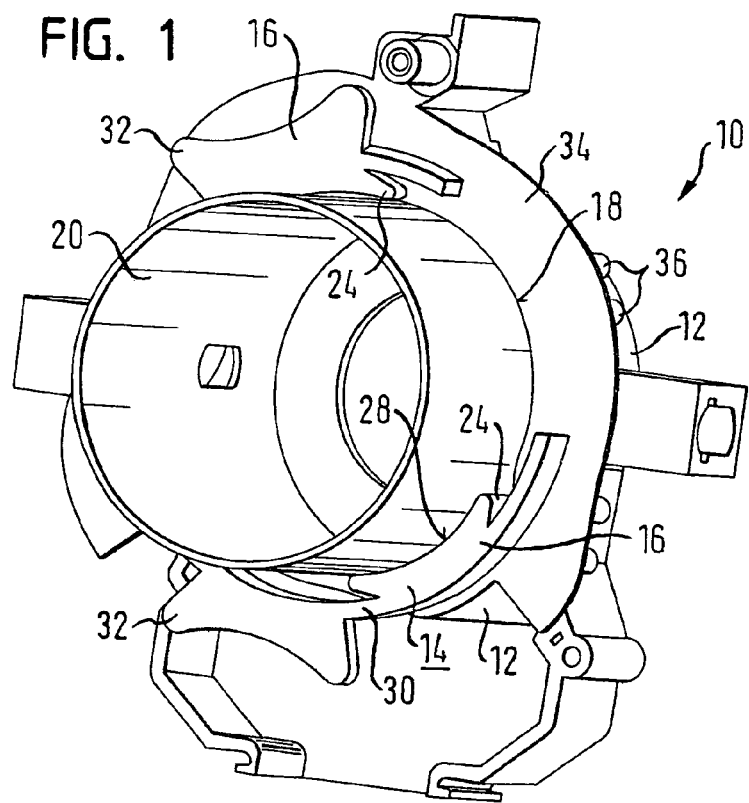
FIG. 1 shows a perspective view of the fastening device according to the invention on a steering column jacket with a large cross-section.

The fastening device 10 illustrated in FIGS. 1 to 6 comprises a fastening sleeve 12 and a equalizer 14 with equalizing jaws 16 which are held so as to be movable rotatably about a central axis of the fastening sleeve 12.

The fastening sleeve 12 has several mounting sections 18, of circular segment shape in cross-section in the embodiment shown here, into which a steering column jacket 20 with a large external diameter is received. The outer surface of the steering column jacket 20 lies in the mounting sections 18 securely and free of play against the wall of the fastening sleeve 12, so that the fastening device 10 is fixed securely on the steering column jacket 20. The mounting sections 18 consequently define a first mounting cross-section which corresponds to the external diameter of the steering column jacket 20.

Adjoining the mounting sections 18 of the fastening sleeve 12, which are of circular segment shape in cross-section, convexities 22 are formed which project radially and extend along the fastening sleeve 12. In the position of the equalizer 14 shown in FIGS. 1 to 3, the equalizing jaws 16 lie inside the convexities 22. The shape of the convexities is adapted to the shape of the equalizing jaws. In particular, the equalizing jaws 16 are provided with chamfered side surfaces 24 which lie against corresponding oblique side walls 26 of the convexities 22. The equalizing jaws 16 have, in addition, a concave clamping surface 28 facing the steering column jacket 20, which lies at least at points against the steering column jacket 20 in the position of the equalizer 14 shown here. Thereby, the clamping of the steering column jacket 20 is additionally intensified in the first mounting cross-section of the fastening sleeve.

The equalizing jaws 16 are connected with each other by cross-pieces 30 to increase the mechanical stability of the equalizer 14 and to improve the operability. In addition, one or more actuating tongues 32 are formed integrally with the cross-pieces 30, in order to allow the equalizer 14 or the equalizing jaws 16 to be rotated in the fastening sleeve 12 by hand or by means of a special tool. The actuating tongues 32 are preferably arranged on an edge of the equalizer 14 on the vehicle side and adjoin a fastening flange 34, formed on as carrier plate, extending radially from the fastening sleeve 12. On the fastening flange 34, several fastening points 36 can be provided on the component side for connection with a column (not illustrated here).

Figure 4:
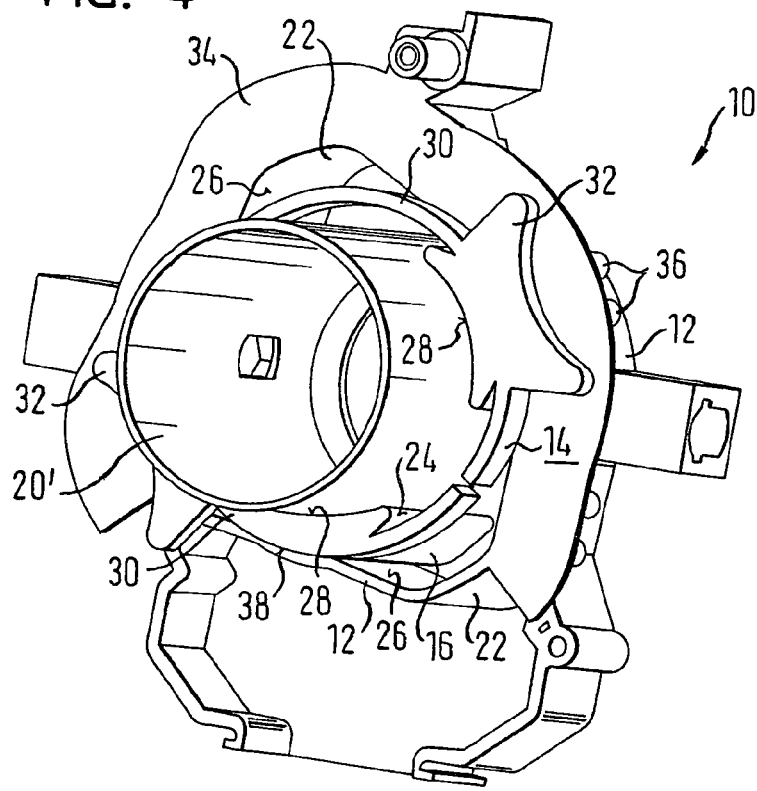
FIG. 4 shows a perspective illustration of the fastening device according to the invention on a steering column jacket with a smaller diameter.
Figure 5:
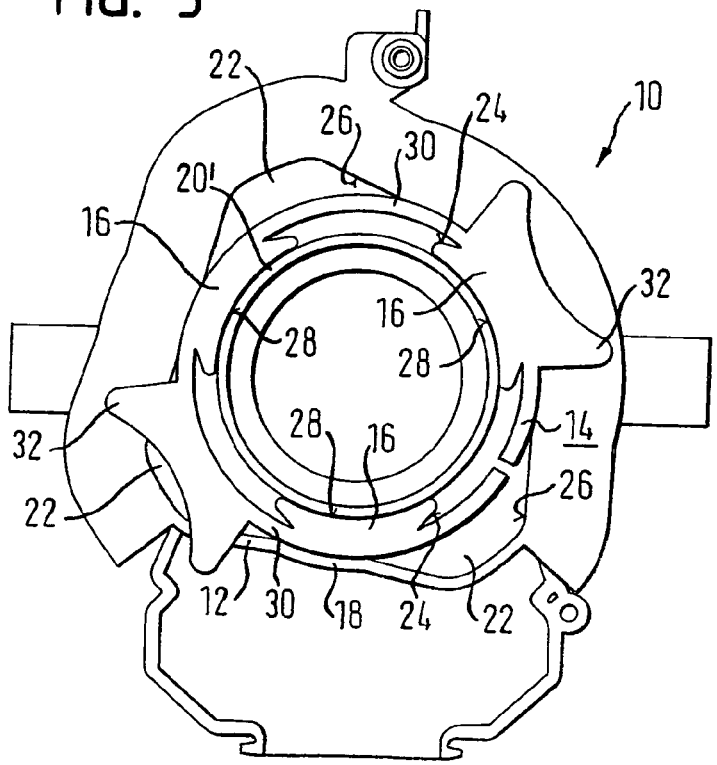
FIG. 5 shows a top view onto an end face of the fastening device of FIG. 4.
Figure 6:
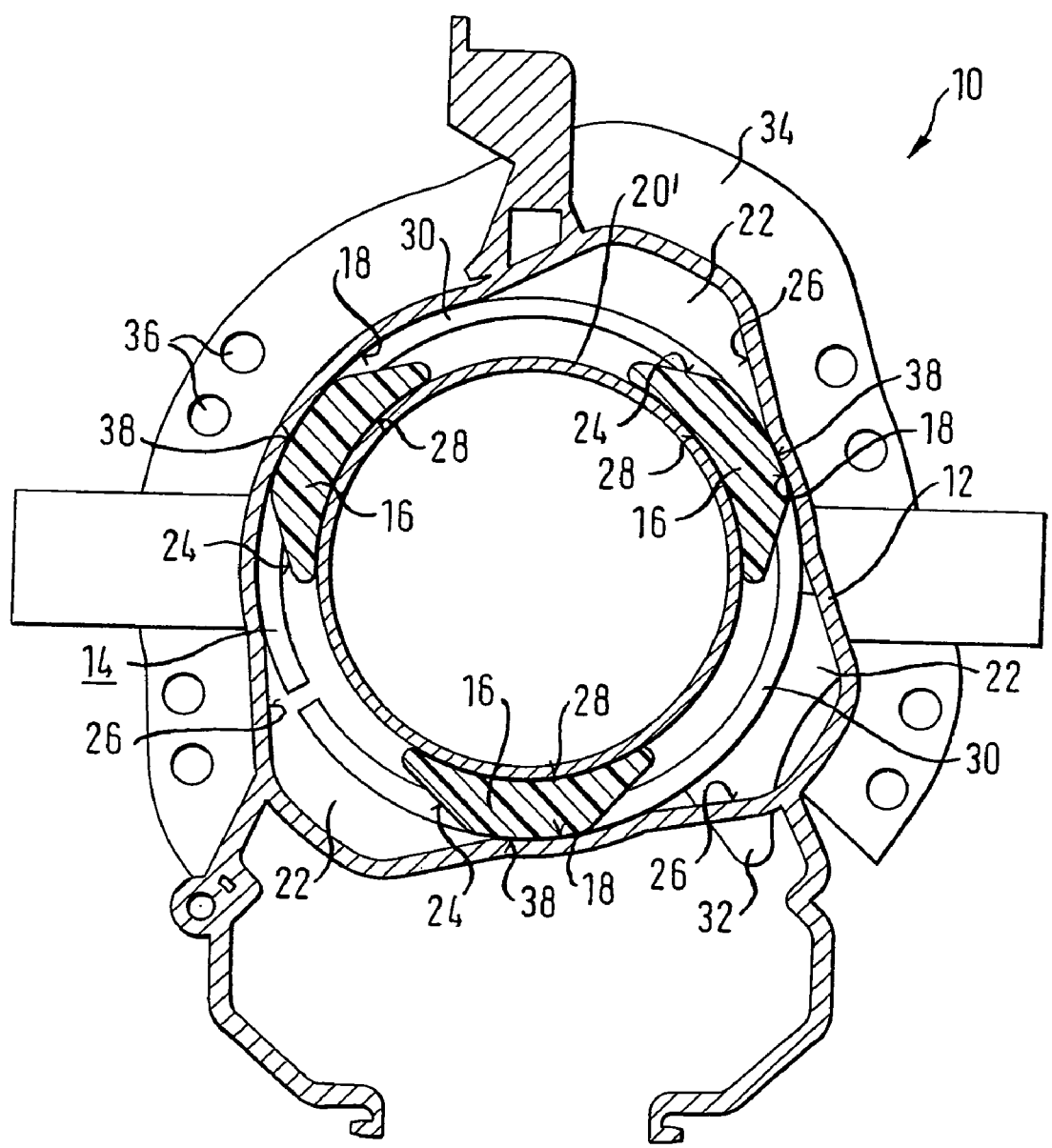
FIG. 6 shows a sectional view of the fastening device of FIG. 4, viewed from the end of the fastening device on the component side.

FIGS. 4 to 6 show the fastening device 10 according to the invention, having received therein a steering column jacket 20' with a smaller external diameter. The equalizer 14 with the equalizing jaws 16 is turned out from the first position into a second position, in which the equalizing jaws 16 lie outside the convexities 22 and hence at least partially in the mounting sections 18. In this position, the concave clamping surfaces 28 of the equalizing jaws 16 define a second mounting cross-section which is smaller than the first mounting cross-section defined by the mounting sections 18 and corresponds to the external diameter of the smaller steering column jacket 20'. The steering column jacket 20', in the position of the equalizer 14 shown in FIGS. 4 to 6, is therefore held securely and free of play by the clamping surfaces 28 of the equalizing jaws 16 in the fastening device 10. The convexly curved cover surfaces 38 of the equalizing jaws 16, lying opposite the clamping surface 28, in turn lie closely against the mounting sections 18 of the fastening sleeve 12. The thickness of the equalizing jaws 16 corresponds to the difference in radius of the steering column jackets 20 and 20'. By means of the equalizing jaws 16 of the equalizer 14, therefore the greater mounting cross-section of the fastening sleeve 12, defined by the mounting sections 18, can be reduced to a defined smaller mounting cross-section adjustable by the thickness of the equalizing jaws 16.

To use the fastening device 10, firstly the equalizer 14, preferably produced as a plastic injection-molded part, with the equalizing jaws 16 connected with each other by cross-pieces 30, is inserted into the fastening sleeve 12. The equalizing jaws 16 lie in the convexities 22 of the fastening sleeve 12 and extend in the axial direction along the inner wall of the fastening sleeve 12. The cross-pieces 30 connect the equalizing jaws 16 preferably at the end of the equalizing jaws 16 on the vehicle side and adjoin there a fastening flange 34 of the fastening sleeve 12. The cross-pieces 30 and the equalizing jaws 16 are constructed in the form of a split ring, the internal diameter of which, measured on the circular area surrounded by the clamping surfaces 28, is slightly greater than the mounting cross-section of the fastening sleeve 12 defined by the mounting sections 18. The equalizer 14, in the shape of a split ring, therefore has to be slightly compressed for the insertion of the equalizing jaws 16 into the convexities 22. Hereby, a pre-stressing is produced, which holds the equalizing jaws 16 securely in the convexities 22. Then the steering column jacket 20 with the greater external diameter, which corresponds to the mounting cross-section defined by the mounting sections 18, can be inserted into the fastening sleeve 12.

Figure 2:
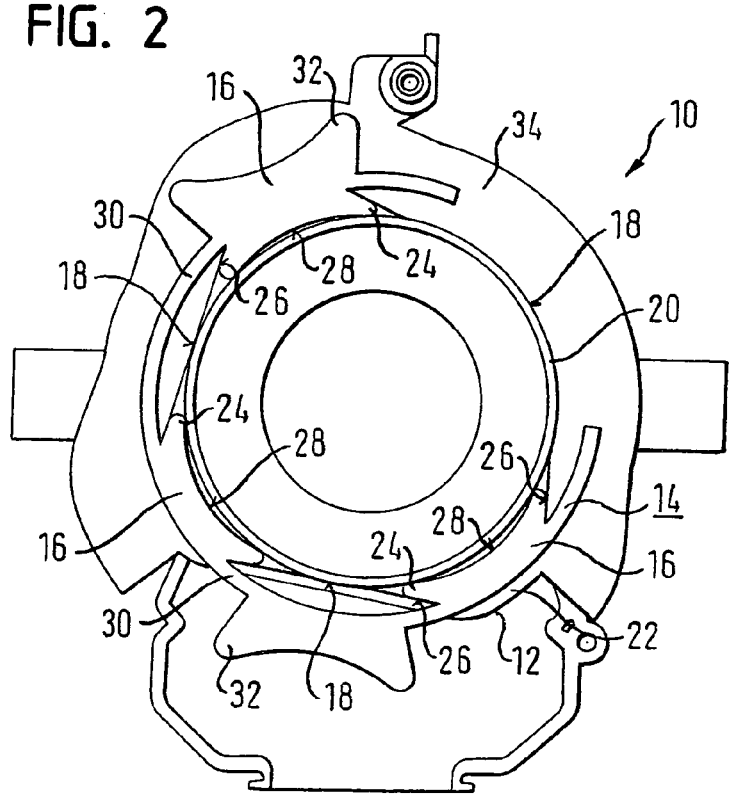
FIG. 2 shows a top view on an end face of the fastening device of FIG. 1.
Figure 3:
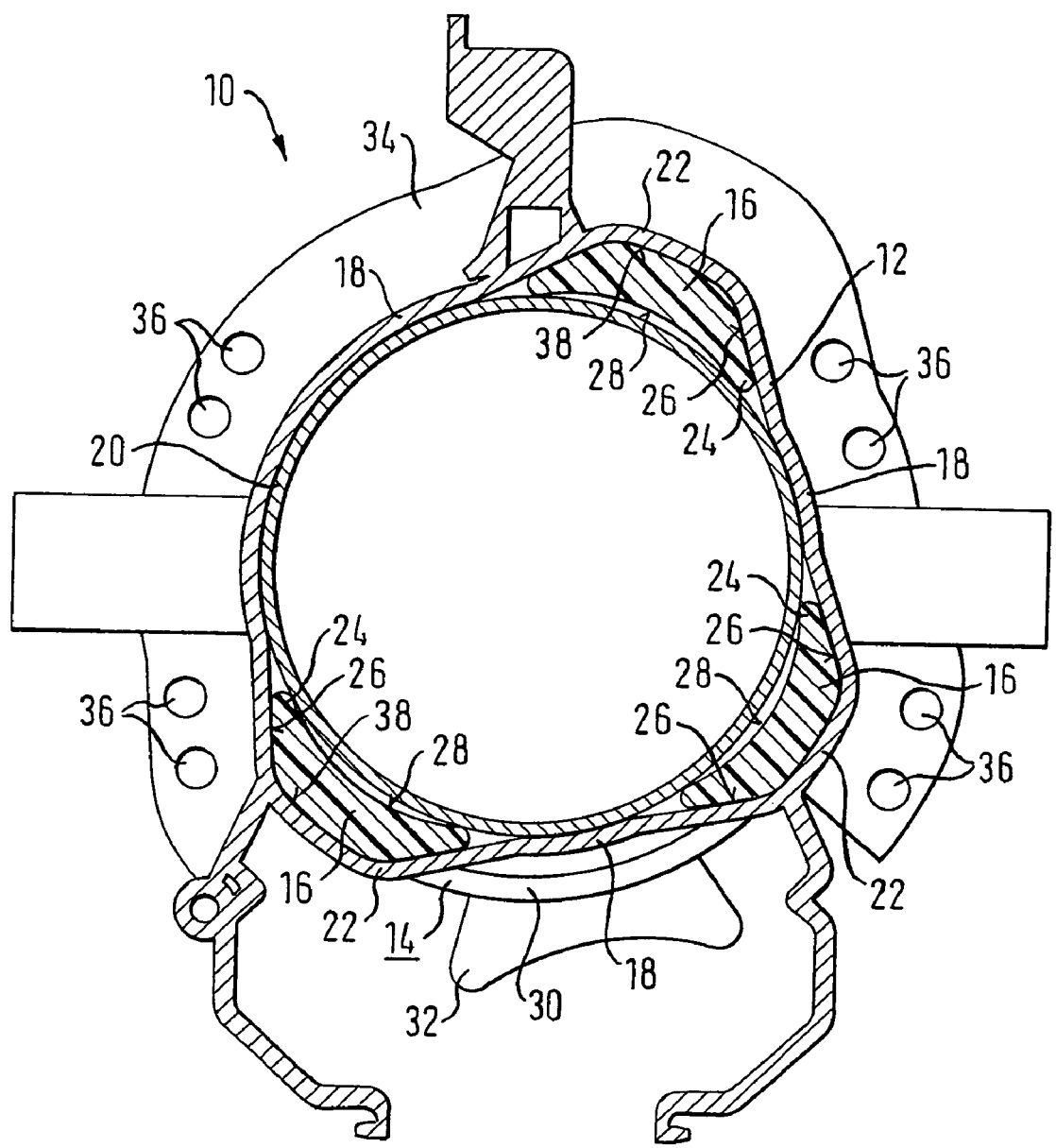
FIG. 3 shows a sectional drawing of the fastening device of FIG. 1, viewed from the end of the fastening device on the component side.

If a steering column jacket 20' with a smaller external diameter is to be used, the equalizer 14 is turned out from the first position, shown in FIGS. 1 to 3, in which the equalizing jaws lie in the convexities 22, and is brought into a second position in which the equalizing jaws are arranged at least partially in the mounting sections 18. The equalizer 14 can be turned either by hand or with an adapted tool by means of the actuating tongues 32 arranged on the cross-pieces 30 or the equalizing jaws 16. The equalizer 14 then comes to lie in a position which is illustrated in FIGS. 4 to 6. The mounting cross-section of the fastening device 10 is then defined by the clamping surfaces 28 and corresponds to the external diameter of the smaller steering column jacket 20', which is thus held free of play in the fastening sleeve 12 by the concave clamping surfaces 28 of the equalizing jaws 16. It is therefore possible in a simple manner to use the fastening device 10 for steering column jackets with different external diameters. Hereby, the requirements for storage are distinctly reduced. As the equalizer 14 can be produced as a plastic injection-molded part, a distinct reduction in the manufacturing costs is also possible.

The invention claimed is:

1. A device (10) for fastening a component to one of a first steering column jacket (20) and a second steering column jacket (20') that has a smaller cross-section than the first steering column jacket (20), said device (10) comprising a fastening sleeve (12) and an equalizer (14) operatively associated with the fastening sleeve (12), the fastening sleeve (12) having at least one mounting section (18) and convexities (22) adjoining the mounting section (18), the mounting section (18) defining a first mounting cross-section to receive the first steering column jacket (20), the equalizer (14) comprising equalizing jaws (16) laterally movable in the fastening sleeve (12), which are movable between a first position in which the equalizing jaws (16) are received in the convexities (22) and an outer surface of the first steering column jacket (20) lies securely in the mounting section (18) free of play against the fastening sleeve (12), and a second position in which the equalizing jaws (16) lie at least partially in the mounting section (18) and define a second mounting cross-section for receiving the second steering column jacket (20').

2. The fastening device (10) according to claim 1, wherein in the second position, the equalizing jaws (16) define the second mounting cross-section for receiving the second steering column jacket (20') such that the second steering column jacket (20') is held securely and free of play by the equalizing jaws (16).

3. The fastening device (10) according to claim 1, wherein the equalizing jaws (16) are connected by cross-pieces (30).

4. The fastening device (10) according to claim 3, wherein the cross-pieces (30) are formed from spring steel.

5. The fastening device (10) according to claim 3, wherein the cross-pieces (30) and the equalizing jaws (16) are formed from plastic in one piece with each other.

6. The fastening device (10) according to claim 1, wherein the equalizer (14) has integrally molded tongues (32).

7. The fastening device (10) according to claim 1, wherein the mounting section (18) has the shape of a circular segment in cross-section.

8. The fastening device (10) according to claim 1, wherein the equalizing jaws (16) are arranged so as to be movable rotatably about a central axis of the fastening sleeve (12).

9. The fastening device (10) according to claim 1, wherein the shape of the equalizing jaws (16) corresponds to the shape of the convexities (22).

10. The fastening device (10) according to claim 1, wherein the equalizing jaws (16) have chamfered side surfaces (26) and a concave clamping surface (28) facing said one of the first steering column jacket (20) and the second steering column jacket (20').

11. The fastening device (10) according to claim 1, wherein in the first position the equalizing jaws (16) are held pre-stressed in the convexities (22).

12. The fastening device (10) according to claim 1, wherein the equalizing jaws (16) extend axially along a part of the fastening sleeve (12).

13. The fastening device (10) according to claim 1, wherein the fastening sleeve (12) has a stop which fixes the equalizer (14) in the first or the second position.

14. The fastening device (10) according to claim 1, wherein the first or the second position is defined by a detent connection between the equalizer (14) and the fastening sleeve (12).

15. The fastening device (10) according to claim 1, wherein the fastening sleeve (12) has an integrally formed carrier plate (34) for fastening the component.

16. The fastening device (10) according to claim 1, wherein the component is a steering column switch.

* * * * *

UNITED STATES PATENT AND TRADEMARK OFFICE
CERTIFICATE OF CORRECTION

PATENT NO. : 7,571,664 B2  Page 1 of 1
APPLICATION NO. : 11/030404
DATED : August 11, 2009
INVENTOR(S) : Altmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1135 days.

Signed and Sealed this

Seventh Day of September, 2010

David J. Kappos
*Director of the United States Patent and Trademark Office*